Nov. 3, 1931.  A. B. SMITH  1,830,248
METHOD OF AND APPARATUS FOR PREPARING MODELS FOR ARTIFICIAL DENTURES
Filed May 7, 1928  2 Sheets-Sheet 1

Inventor
Anson B. Smith;
By Lyon & Lyon
Attorneys

Nov. 3, 1931.  A. B. SMITH  1,830,248
METHOD OF AND APPARATUS FOR PREPARING MODELS FOR ARTIFICIAL DENTURES
Filed May 7, 1928  2 Sheets-Sheet 2
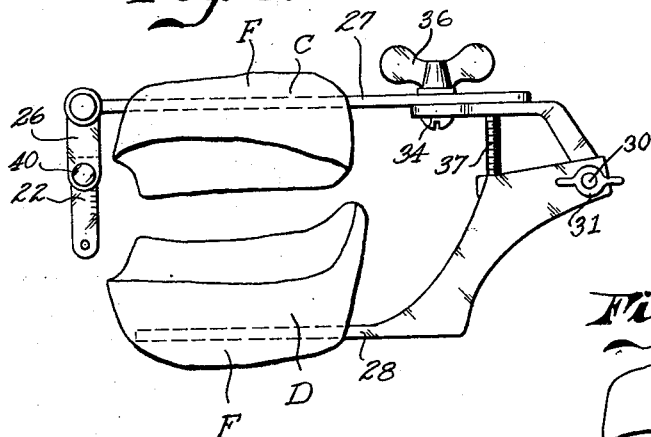
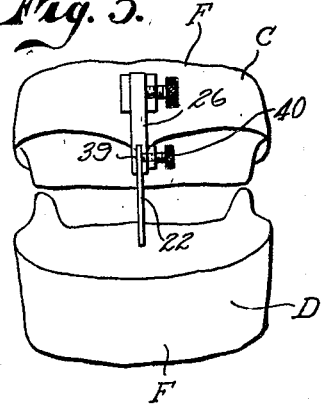
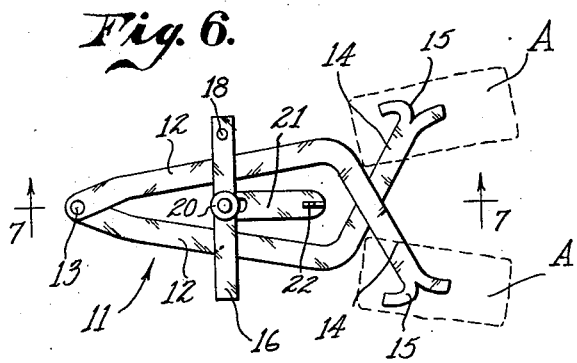
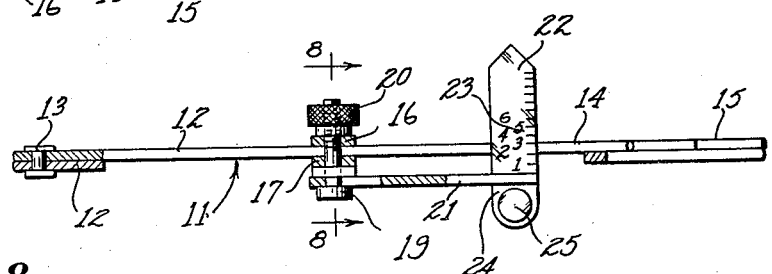
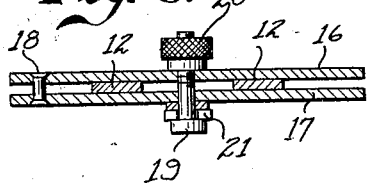
Inventor
Anson B. Smith;
By Lyon & Lyon
Attorneys Patented Nov. 3, 1931

1,830,248

UNITED STATES PATENT OFFICE

ANSON B. SMITH, OF LOS ANGELES, CALIFORNIA

METHOD OF AND APPARATUS FOR PREPARING MODELS FOR ARTIFICIAL DENTURES

Application filed May 7, 1928. Serial No. 275,620.

This invention relates to methods of preparing models for artificial dentures.

In known methods of preparing models for artificial dentures, a wax impression is first made of the posterior portions of the upper and lower alveolar ridges with said ridges in biting relation, and the wax impression, or "bite" as it is commonly called, is afterwards placed between the plaster models of the alveolar ridges. In the old methods there is no registration of the lip position in relation to the models, and this invention provides for such registration.

This invention provides for registration of the lowered and raised positions of the upper lip in relation to the models so as to aid the dentist in setting the teeth in the models, the lower position of said lip being the normal position thereof, and the raised position being that resulting when the lip is drawn upwardly, as in smiling.

Thus, this invention facilitates the making of artificial dentures so that the teeth will be of the proper length for naturalness of appearance of the patient and so that the rubber that simulates the natural gums will be hidden by the upper lip, even when said upper lip is in the raised position, as mentioned above.

Briefly stated, according to this invention, a wax impression is first made of the posterior portions of the upper and lower alveolar ridges in biting relation. This is done by mounting blocks of wax on a device that will be termed, herein, a relater, and inserting the mounted blocks of wax into the patent's mouth and then requiring the patent to bite on the wax blocks in a natural manner.

The next step is to register the lowered and raised positions of the upper lip while the alveolar ridges are in the bite relation. This is accomplished by a graduated scale on the relater, said scale being positioned in front of the upper lip when the wax blocks are positioned in the mouth of the patient between the alveolar ridges and, more especially, between the rear portions of said ridges. The position of the lowered upper lip in relation to the scale is noted, and then the patient is required to smile so as to raise the upper lip and the raised position is then noted in relation to the scale.

The relater, with the wax impression thereon, is then removed from the patient's mouth and, either before or after the making of the wax impression as mentioned above, the plaster models of the upper and lower alveolar ridges are prepared in the usual manner well understood in this art, and, therefore, not necessary to describe in detail herein.

The next operation is to secure the wax impression, or bite, to the models in the bite relation. This may be done in the usual manner by spreading a little of the wax with a hot spatula on the models. We now have assembled the wax impression, the models and the relater, and the next step is to place this assembly in what is commonly termed an articulator, and which will be termed herein a model holder, as its function is to hold the models in the bite relation while the dentist is affixing the teeth to said models. The models will be secured to the model holder in the usual manner by applying plaster Paris to the models and around portions of the model holder. In this instance the model holder is provided with an element which I term a co-relater, which will now be releasably secured to the scale of the relater so as to hold said scale in a fixed relation to the models when the wax shall have been removed from said models. The scale is then released from the remaining parts of the relater and the wax impression is melted out from between the models, thus leaving the models attached to the model holder.

The models are now ready to receive the artificial teeth which are mounted thereon in a manner well understood in this art. In mounting said teeth, the dentist will be guided by the scale which indicates the center line of the mouth and lips, and also the lip positions as mentioned above, thus enabling the dentist to accurately place the teeth on the models so that the very best results will be obtained when the final artificial dentures are placed in the patient's mouth.

It will be clear from the foregoing that an important object of the invention is to make provision for greater accuracy in the preparation of models for artificial dentures so that said dentures, when in place in the patient's mouth, will give a natural appearance to the patient's face, and so that it will not be so obvious that the patient is provided with artificial dentures.

The accompanying drawings illustrate the method and apparatus embodying the invention:

Figure 4 is a view similar to Figure 3 omitting the wax impression and all parts of the relater excepting the scale, which is shown attached to the co-relater.

Figure 5 is a view of Figure 4 from the left thereof.

Figure 6 is a plan view of the relater, wax blocks being indicated in broken lines and mounted on the relater.

Figure 7 is an enlarged longitudinal midsection on the line indicated by 7—7 of Figure 6.

Figure 8 is a vertical section on the line indicated by 8—8 of Figure 7.

Figure 1:
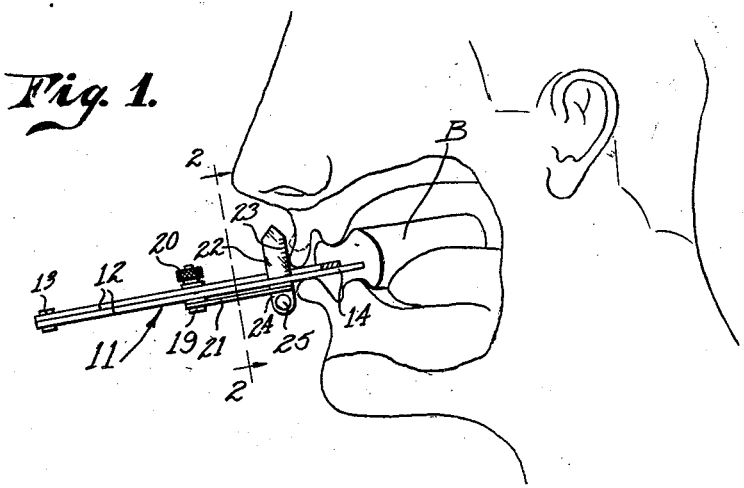
Figure 1 is a side elevation of the relater with a wax block mounted thereon and indicated in the position it occupies in the patient's mouth while the bite is being made. The upper lip is indicated in a raised position in dotted lines, and a portion of the relater is shown in section.

In carrying out the invention, I employ what I term a relater, which is indicated in general by character 11 and is constructed as follows:

Two arms 12 are pivoted together at 13 and have angularly extending portions 14 terminating in forks 15 which are adapted to be inserted in wax blocks which are indicated at A in Figure 6. The arm portions 14 cross one another so that the forked tips 15 will be conveniently positioned at the extreme sides of the relater. Mounted on the arms 12 is a clamp comprising upper and lower clamping members 16, 17 which embrace said members between them. At one end the members 16, 17 are held together by a rivet 18, or its equivalent, and approximately midway of the clamping members, and passing therethrough is a clamping screw 19 provided with a nut 20 whereby the members 16, 17 may be drawn into snug frictional engagement with the arms 12, thus holding the arms 12 in fixed relation to one another and to the clamp. The lower clamping member 17 is provided with a forwardly extending leg 21 which carries at its forward tip a detachably mounted scale 22 which is graduated as indicated at 23, said graduations being numbered consecutively from the lower end of the scale upwardly as clearly shown in Figure 7. The leg 21 is provided with a down-turned flange 24 and a set screw 25 passes through said flange and through the scale 22.

I also employ what I term a model holder, but which is commonly termed an articulator, and said model holder may be of the usual construction excepting for the provision of one element which I term a co-relater and which is indicated at 26. It will aid to an understanding of the invention to briefly describe the model holder, even though it may be of the usual construction, and, in this instance, said model holder comprises upper and lower jaws 27, 28. Pivots 30, 31 are mounted in one of the jaws, the jaw 28 in this instance, and engage pivot seats 32, 33 in the other jaw 27. The upper jaw 27 is made in two sections adjustably connected by a screw 34 projecting from one of the sections through a slot 35 in the other section, and the screw is provided with a wing nut 36. A means is provided for adjustably limiting the movement of the jaws 27, 28 toward each other and this means includes a screw 37 threaded in one of the jaws, the jaw 28 in this instance, and bearing against the other jaw 27. The screw 37 is provided with a lock nut 38. The co-relater 26, hereinbefore mentioned, is fixed to the outer end of the jaw 27 and projects substantially vertical therefrom. The co-relater 26 is cleft, being provided with a slot 39 in its lower end adapted to receive the scale 22. The slotted portion of the relater is provided with a set screw 40 whose inner end is adapted to bear against the scale 22, when it is desired to detachably connect said scale to the co-relater, as shown in Figures 4 and 5.

Figure 2:
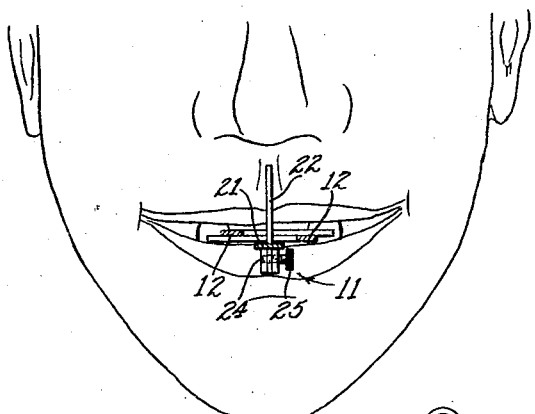
Figure 2 is a front view of Figure 1, some of the parts of the relater being shown in section on the line indicated by 2—2 of Figure 1.

The apparatus described above is used to perform the method as follows:

The wax blocks A, having been affixed to the forks 15, as shown in Figure 6, said blocks will be inserted, together with the relater 11, into the patient's mouth and a wax impression, or bite, will be made of the posterior portions of the upper and lower alveolar ridges with said ridges in biting relation, as indicated in Figure 1. The clamp holding the scale 22 will be adjusted with reference to the arms 12 so that the scale will be accurately aligned with the center of the upper lip immediately in front of said lip, as indicated in Figures 1 and 2. The dentist will observe on the scale 22 the position of the lowered upper lip of the patient and he will then require the patient to smile so as to raise the upper lip as indicated in dotted lines in Figure 1 and the dentist will then observe on the scale such raised position and he will make a note of the numbers that correspond to the lowered and raised positions of the upper lip so that he can afterwards refer to such notes, when the artificial teeth are being placed on the models. The dentist will then remove the relator carrying the bite, indicated at B in Figure 1, from the patient's mouth and the next operation is to place the bite without removing it from the relator, between the models of the patient's alveolar ridges.

It is not necessary herein to describe in detail the making of said models, as this is well understood in the art relating to dentistry. Such models are indicated in Figure 3, the model of the upper alveolar ridge being indicated at C and that of the lower ridge being indicated at D.

Figure 3:
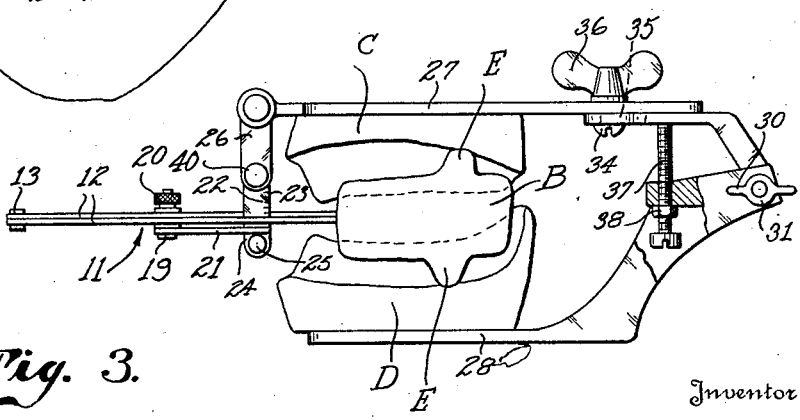
Figure 3 is an assembled view of the relater, wax impression, models and model holder.

The next operation is to secure the wax impression or bite to the models in the bite relation and this may be done in the usual manner by placing the bite between the models and applying a hot spatula to portions of the wax adjacent to the models and spreading the heated wax over marginal portions of the models as indicated at E in Figure 3. This assembly is then placed between the jaws 27, 28 and the co-relater 26 is secured to the scale 22. This assembly is shown complete in Figure 3. In securing the scale to the co-relater, the models are free to move relative to the model holder, thus enabling the same exact relation to be maintained between the bite and the models as previously existed between the bite and the alveolar ridges from which said models were made. The models are not moved in relation to the bite but the model holder is adjusted in relation to the models, and this relation is maintained when the co-relater and scale are co-operatively secured together by engaging the scale in the slot 39 and tightening the set screw 40. Plaster is then applied to the models C, D and extended around portions of the jaws 27, 28, as indicated at F in Figure 4, so as to secure the models to said jaws, in a manner well understood in this art. Then the set screw 37 will be adjusted to just engage the jaw 27 so that when the wax impression is subsequently removed, the spacing of the models C, D will remain exactly the same as when the wax is in place. The set screw 25 will then be loosened and the wax impression melted out from between the models, and the relater, with the exception of the scale 22, will at the same time be removed, thus leaving the scale 22 suspended from the upper jaw 27 of the model holder.

The models are now ready to receive the artificial teeth, in a manner well understood in this art and, it is to be noted that in placing the upper teeth in position on the models, the dentist will utilize the record that he has made of the lowered and raised positions of the lip on the scale 22 and place said teeth in accordance with the noted graduations on the scale, so that said teeth will be mounted in a manner to cause them to finally project the proper distance from the rubber in which they are to be imbedded, and so that the rubber, that simulates the color of the natural gums, will not project below the upper lip when said upper lip is in the raised position produced by opening the mouth as in smiling and laughing.

An added advantage of the provision of the elements 22, 26 is that thereby the dentist will be properly guided in placing the models in the model holder so that the models will lie parallel to the pivotal axis of the model holder, which axis corresponds with the axis of articulation of the lower jaw, thus insuring that the artificial dentures finally produced will not lie in tilted positions in the jaws but will be level as they should be for comfort, appearance and maxium usefulness.

I claim:

1. An apparatus of the character described comprising a means to hold wax blocks while the patient's bite is being impressed on said blocks and after the impression is made, a scale, a means mounting the scale on said first mentioned means in an edgewise position relative to the lips of the patient to enable the dentist to observe what levels the edge of the upper lips of the patient occupy when said lip is in its natural lowered position and in raised position as in smiling, a means to hold models of the patient's alveolar ridges in a definite spaced relation when the blocks on the holding means are positioned between the models, and a means to detachably connect the scale to the model holding means while said scale is still mounted on the block holding means so that when the scale is subsequently detached from the block holding means the dentist can compare the lowered lip position on the scale to the position of the lower ends of artificial teeth as he mounts said teeth on the upper model and can compare the raised lip position on the scale to the line above which said lip will be embedded in the substance that imitates the natural gums.

2. The method described consisting in making impressions of the alveolar ridges, casting models from the impressions thus made, securing bite impression blocks in fixed relation, then placing the impression blocks in the fixed relation between the patient's alveolar ridges, taking the patient's bite on the blocks while in the fixed relation, registering in fixed relation to the blocks the positions of the central points of the lowered and raised upper lip in relation to the positions of the impression blocks after the bite has been taken and while the blocks are in the fixed relation between the patient's alveolar ridges, then removing the impression blocks from between the alveolar ridges while said blocks are in the fixed relation, then placing the impression blocks between the ridge models while the blocks are in the fixed relation, then securing the impression blocks to the ridge models while said blocks are in the fixed relation between the ridge models, then placing the models with the blocks in fixed relation secured thereto between the jaws of an articulator, then securing the models to the jaws of the articulator while the blocks in fixed relation are secured to the models, then transferring the registered positions obtained by the sixth mentioned operation from the fixed relation with the blocks to a corresponding fixed relation with the models while the blocks are secured to the models in the articulator, and then removing the blocks from between the models while said models are fixed to the jaws of the articulator without disturbing the registered positions thus transferred.

Signed at Los Angeles, Calif., this 27th day of April, 1928.

ANSON B. SMITH.